United States Patent
Sasaki et al.

(10) Patent No.: US 8,422,166 B1
(45) Date of Patent: Apr. 16, 2013

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(73) Assignees: Headway Technologies, Inc., Milpitas, CA (US); Sae Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/571,024

(22) Filed: Aug. 9, 2012

Related U.S. Application Data (63) Continuation-in-part of application No. 13/304,975, filed on Nov. 28, 2011, now Pat. No. 8,274,759.

(51) Int. Cl.
*G11B 5/147* (2006.01)

(52) U.S. Cl.
USPC ............. 360/123.06; 360/123.11; 360/125.02

(58) Field of Classification Search ............. 360/123.01, 360/123.02, 123.03, 123.05, 123.06, 123.11, 360/123.12, 125.02, 125.03, 125.06, 125.27, 360/125.28
See application file for complete search history.

(56) References Cited

U.S. PATENT DOCUMENTS

| | | | | |
|---|---|---|---|---|
| 7,343,668 B2 * | 3/2008 | Kobayashi | ................ | 29/603.16 |
| 7,443,633 B2 * | 10/2008 | Tagami et al. | ............. | 360/125.5 |
| 7,940,495 B2 * | 5/2011 | Sasaki et al. | ............. | 360/125.27 |
| 8,035,920 B2 * | 10/2011 | Na et al. | ................... | 360/123.03 |
| 8,035,921 B2 * | 10/2011 | Sunwoo | ................... | 360/123.05 |
| 8,201,320 B2 * | 6/2012 | Allen et al. | ................ | 29/603.16 |
| 8,300,357 B1 * | 10/2012 | Sasaki et al. | ............. | 360/123.06 |
| 2004/0150910 A1 * | 8/2004 | Okada et al. | .................. | 360/125 |
| 2005/0083608 A1 * | 4/2005 | Watanabe | ..................... | 360/126 |
| 2005/0280937 A1 * | 12/2005 | Sasaki et al. | .................. | 360/126 |
| 2006/0126221 A1 * | 6/2006 | Kobayashi et al. | ........... | 360/123 |
| 2008/0024911 A1 * | 1/2008 | Sasaki et al. | .................. | 360/110 |
| 2008/0297953 A1 * | 12/2008 | Matono et al. | ................ | 360/319 |
| 2009/0015965 A1 | 1/2009 | Sunwoo | | |
| 2009/0059426 A1 * | 3/2009 | Sasaki et al. | ............. | 360/125.02 |
| 2009/0141406 A1 * | 6/2009 | Sasaki et al. | .................. | 360/319 |
| 2011/0170216 A1 * | 7/2011 | Sasaki et al. | ............. | 360/123.11 |
| 2012/0188666 A1 * | 7/2012 | Sasaki et al. | ............. | 360/123.12 |
| 2012/0257304 A1 * | 10/2012 | Sasaki et al. | ............. | 360/123.12 |

* cited by examiner

*Primary Examiner* — Brian Miller
(74) *Attorney, Agent, or Firm* — Oliff & Berridge, PLC (57) ABSTRACT

A magnetic head includes a coil, a main pole, a write shield, and a return path section. The return path section is located forward of the main pole in a direction of travel of a recording medium to thereby define a space. The coil includes a first coil element and second coil elements extending to pass through the space. The second coil elements are located forward of the first coil element in the direction of travel of the recording medium. The return path section includes a first portion located such that the first coil element is interposed between the first portion and the medium facing surface, and a second portion located such that the second coil elements are interposed between the second portion and the medium facing surface.

6 Claims, 8 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of a recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on a substrate. The write head section includes a main pole that produces a magnetic field in a direction perpendicular to the plane of a recording medium. The main pole includes, for example, a track width defining portion having an end located in a medium facing surface that faces a recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the backward side in the direction of travel of a recording medium relative to the slider. The trailing side is the forward side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over a recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For achieving higher recording density, it is necessary to prevent adjacent track erasure.

Providing a write shield near the main pole is effective for preventing adjacent track erasure induced by the skew mentioned above and increasing the recording density. The write shield has an end face located in the medium facing surface. For example, U.S. Patent Application Publication No. 2009/0015965 A1 discloses a magnetic head including a return yoke that forms a magnetic path in conjunction with the main pole. The return yoke includes a return yoke tip having an end face that is located in the medium facing surface and spaced from an end face of the main pole by a predetermined distance. The return yoke tip functions as a write shield.

In a magnetic head having a write shield, there are typically provided one or more return path sections for connecting the write shield and part of the main pole away from the medium facing surface to each other. The write shield and the one or more return path sections have the function of capturing a magnetic flux that is produced from the end face of the main pole and spreads in directions other than the direction perpendicular to the plane of a recording medium, so as to prevent the magnetic flux from reaching the recording medium. The write shield and the one or more return path sections also have the function of allowing a magnetic flux that has been produced from the end face of the main pole and has magnetized the recording medium to flow back to the main pole. Thus, the magnetic head having the write shield makes it possible to prevent the occurrence of adjacent track erasure and achieves a further improvement in recording density.

The position of an end of a record bit to be recorded on a recording medium depends on the position of the trailing-side end of the end face of the main pole located in the medium facing surface. To define the position of the end of the record bit with high accuracy, it is therefore effective to provide the write shield with an end face including an end face portion located on the trailing side relative to the end face of the main pole.

In addition, as the frequency of a recording signal is increased in order to increase the recording density, the magnetic head is required to be improved in the rate of change in the direction of the magnetic flux produced from the end face of the main pole. To satisfy this requirement in the magnetic head having a write shield, it is particularly effective to provide a return path section that is located on the trailing side relative to the main pole and to reduce the length of the return path section, in addition to forming the end face of the write shield to include an end face portion located on the trailing side relative to the end face of the main pole.

U.S. Patent Application Publication No. 2009/0015965 A1 discloses a technology for reducing the yoke length which is related to the length of the return path section located on the trailing side relative to the main pole. Specifically, the technology provides a coil encompassing the main pole in a solenoid structure. The coil includes a lower wire portion passing through the lower portion of the main pole, an upper wire portion passing through the upper portion of the main pole, and a connection portion electrically connecting the lower wire portion and the upper wire portion. The upper wire portion includes an upper wire layer having a stack of at least two layers.

The magnetic head disclosed in U.S. Patent Application Publication No. 2009/0015965 A1 has the following problems, however. In this magnetic head, the upper wire portion includes a first upper wire layer which is relatively closer to the main pole and a second upper wire layer which is relatively farther from the main pole. The return yoke includes a portion that is located farther from the medium facing surface than is the upper wire portion. The bottom surface of this portion is in contact with the top surface of a sub-yoke provided on the main pole. The aforementioned portion of the return yoke will hereinafter be referred to as the back gap portion. The distance from the medium facing surface to an arbitrary point on an end of the back gap portion facing toward the medium facing surface increases stepwise with decreasing distance from the arbitrary point to the main pole. Such a shape of the back gap portion causes the direction of a magnetic flux flowing from the back gap portion toward the sub-yoke to change at a great angle of 90° or more in the vicinity of the interface between the back gap portion and the sub-yoke. This may induce leakage of magnetic flux in the vicinity of the interface between the back gap portion and the sub-yoke, and thereby hinder the main pole from producing a write magnetic field of sufficient magnitude.

As such, it has conventionally been difficult to allow the main pole to produce a write magnetic field of sufficient magnitude while reducing the length of a magnetic path that passes through a return path section and the main pole, the return path section being located forward in the direction of travel of a recording medium (i.e., located on the trailing side) relative to the main pole.

OBJECT AND SUMMARY OF THE INVENTION

It is an object of the present invention to provide a magnetic head for perpendicular magnetic recording that allows the main pole to produce a write magnetic field of sufficient magnitude while allowing a reduction in length of a magnetic path that passes through a return path section and the main pole, the return path section being located forward in the direction of travel of a recording medium relative to the main pole.

A magnetic head for perpendicular magnetic recording of the present invention includes: a medium facing surface that faces a recording medium; a coil that produces a magnetic field corresponding to data to be written on the recording medium; a main pole; a write shield; a gap part; and a first return path section. The main pole has an end face located in the medium facing surface, allows a magnetic flux corresponding to the magnetic field produced by the coil to pass, and produces a write magnetic field for writing the data on the recording medium by means of a perpendicular magnetic recording system. The write shield is made of a magnetic material and has an end face located in the medium facing surface. The gap part is made of a nonmagnetic material and interposed between the main pole and the write shield. The first return path section is made of a magnetic material and located forward of the main pole in a direction of travel of the recording medium.

The end face of the write shield includes a first end face portion that is located forward of the end face of the main pole in the direction of travel of the recording medium. The first return path section connects the write shield and part of the main pole away from the medium facing surface to each other so that a first space is defined by the main pole, the gap part, the write shield, and the first return path section. The coil includes at least one first coil element and a plurality of second coil elements extending to pass through the first space. The plurality of second coil elements are located forward of the at least one first coil element in the direction of travel of the recording medium.

The first return path section includes a first portion located such that the at least one first coil element is interposed between the first portion and the medium facing surface, and a second portion located such that the plurality of second coil elements are interposed between the second portion and the medium facing surface. The second portion is located forward of the first portion in the direction of travel of the recording medium. In a cross section that intersects the end face of the main pole located in the medium facing surface and that is parallel to the direction of travel of the recording medium and perpendicular to the medium facing surface, an end portion of the at least one first coil element that is located at a farthest position from the medium facing surface in the at least one first coil element is closer to the medium facing surface than is an end portion of the plurality of second coil elements that is located at a farthest position from the medium facing surface in the plurality of second coil elements, and an end portion of the first portion that is located at a closest position to the medium facing surface in the first portion is closer to the medium facing surface than is an end portion of the second portion that is located at a closest position to the medium facing surface in the second portion.

In the magnetic head for perpendicular magnetic recording of the present invention, the at least one first coil element may be smaller in number than the plurality of second coil elements.

In the magnetic head for perpendicular magnetic recording of the present invention, the write shield may include a first shield that is located forward of the main pole in the direction of travel of the recording medium and includes the first end face portion. In this case, the at least one first coil element may be interposed between the first shield and the first portion.

In the magnetic head for perpendicular magnetic recording of the present invention, a minimum distance between the first portion and the medium facing surface may fall within the range of 0.8 to 4.0 µm.

The magnetic head for perpendicular magnetic recording of the present invention may further include a second return path section that is made of a magnetic material and located backward of the main pole in the direction of travel of the recording medium. The second return path section connects the write shield and part of the main pole away from the medium facing surface to each other so that a second space is defined by the main pole, the gap part, the write shield, and the second return path section. The coil may further include at least one third coil element extending to pass through the second space.

In the magnetic head for perpendicular magnetic recording of the present invention, the end face of the write shield may further include a second, a third, and a fourth end face portion. The second end face portion is located backward of the end face of the main pole in the direction of travel of the recording medium. The third and fourth end face portions are located on opposite sides of the end face of the main pole in a track width direction.

The magnetic head for perpendicular magnetic recording of the present invention is configured so that in the cross section that intersects the end face of the main pole located in the medium facing surface and that is parallel to the direction of travel of the recording medium and perpendicular to the medium facing surface, the end portion of the first portion that is located at the closest position to the medium facing surface in the first portion is closer to the medium facing surface than is the end portion of the second portion that is located at the closest position to the medium facing surface in the second portion. This makes it possible to reduce the length of the magnetic path that passes through a first return path section and the main pole, the first return path section being located forward of the main pole in the direction of travel of the recording medium, while ensuring sufficient magnetomotive force of the coil.

Further, according to the present invention, since the end portion of the first portion that is located at the closest position to the medium facing surface in the first portion is closer to the medium facing surface than is the end portion of the second portion that is located at the closest position to the medium facing surface in the second portion, there occurs no great change in the direction of a magnetic flux that flows from the second portion of the first return path section toward the main pole by way of the first portion. The present invention thus makes it possible to prevent leakage of magnetic flux from the vicinity of the first and second portions of the first return path section to the outside.

Consequently, the present invention allows the main pole to produce a write magnetic field of sufficient magnitude while allowing a reduction in length of the magnetic path that passes through a first return path section and the main pole, the first return path section being located forward of the main pole in the direction of travel of the recording medium.

Other objects, features and advantages of the present invention will become fully apparent from the following description.

DETAILED DESCRIPTION OF THE PREFERRED EMBODIMENTS

First Embodiment

Figure 1:
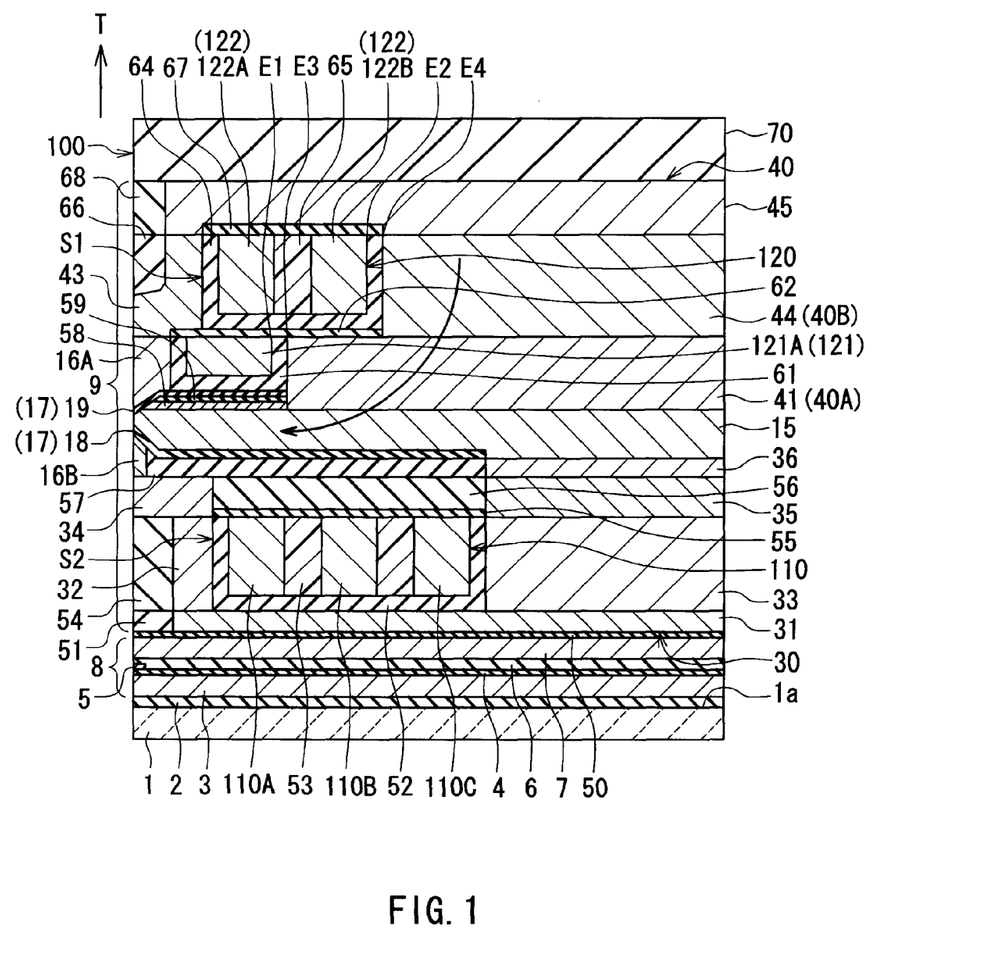
FIG. 1 is a cross-sectional view of a magnetic head according to a first embodiment of the invention.
Figure 2:
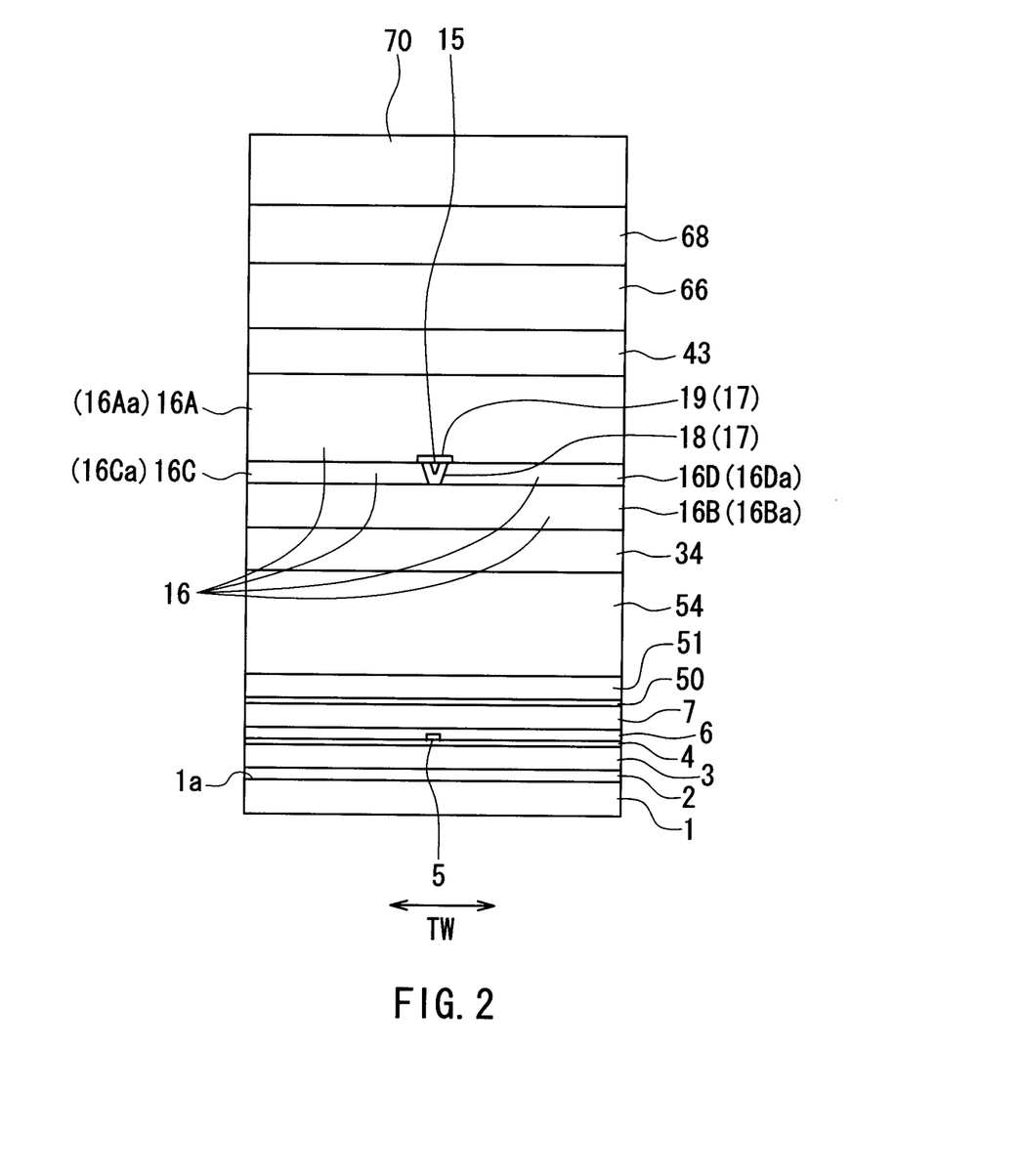
FIG. 2 is a front view showing the medium facing surface of the magnetic head according to the first embodiment of the invention.
Figure 3:
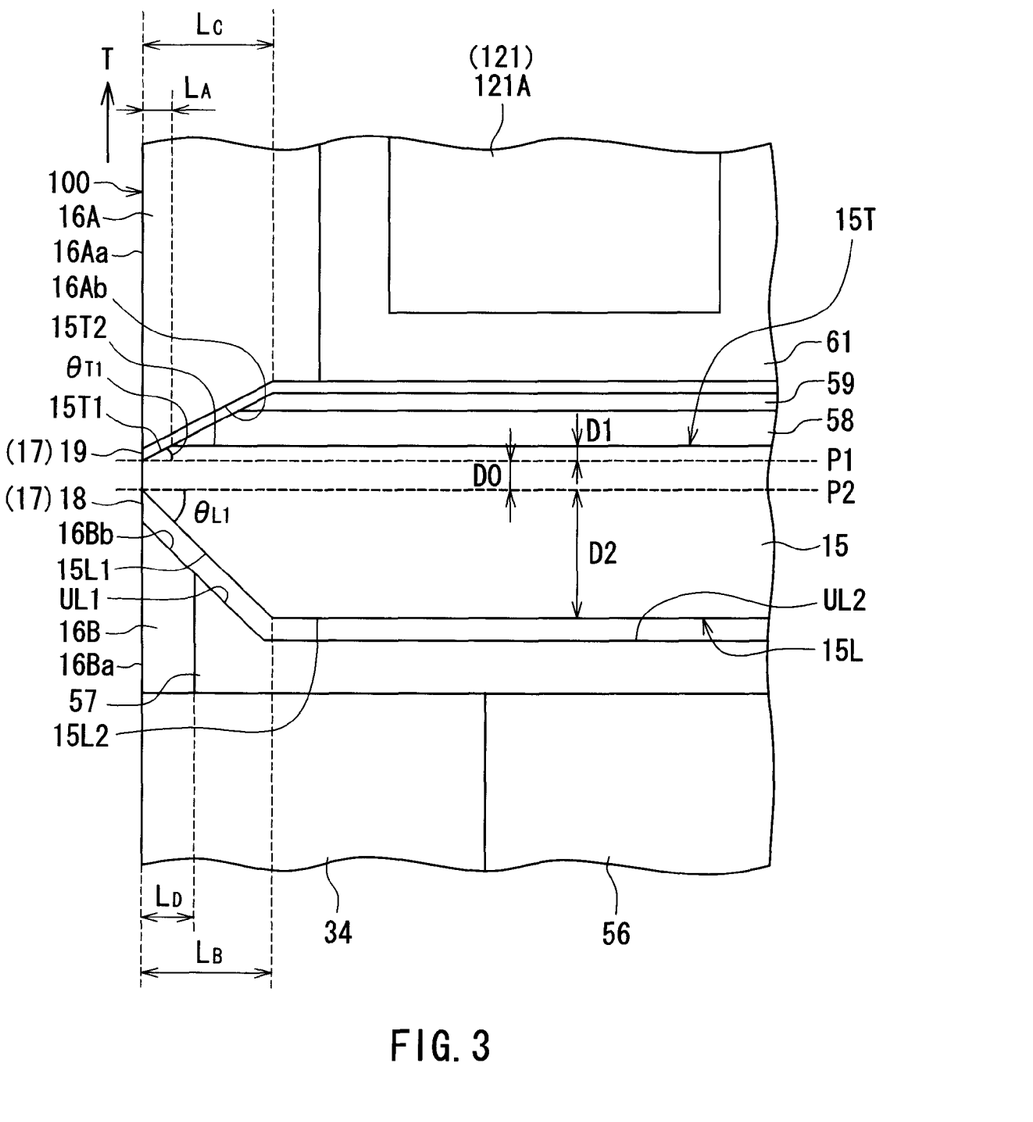
FIG. 3 is a cross-sectional view showing a part of a main pole in the vicinity of the medium facing surface in the magnetic head according to the first embodiment of the invention.
Figure 4:
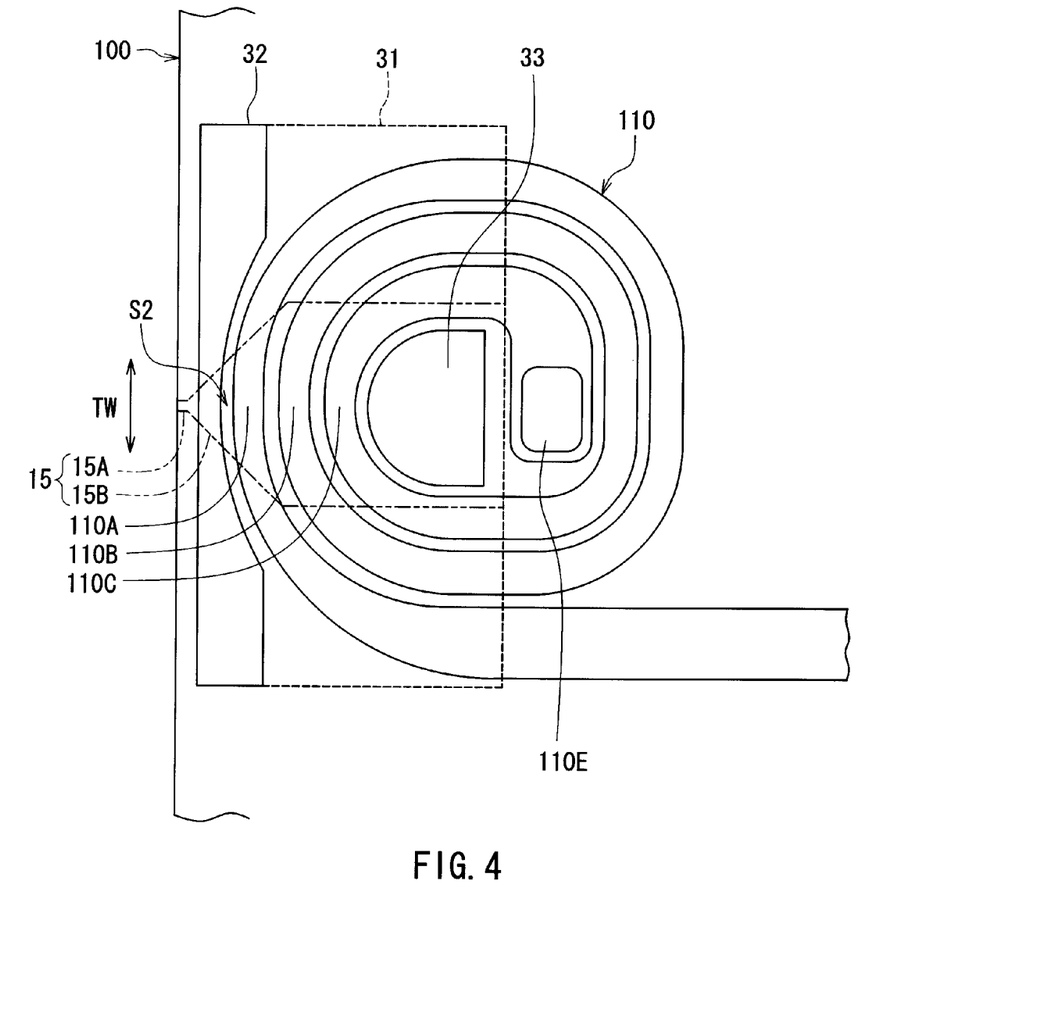
FIG. 4 is a plan view showing a second portion of a coil in the magnetic head according to the first embodiment of the invention.
Figure 5:
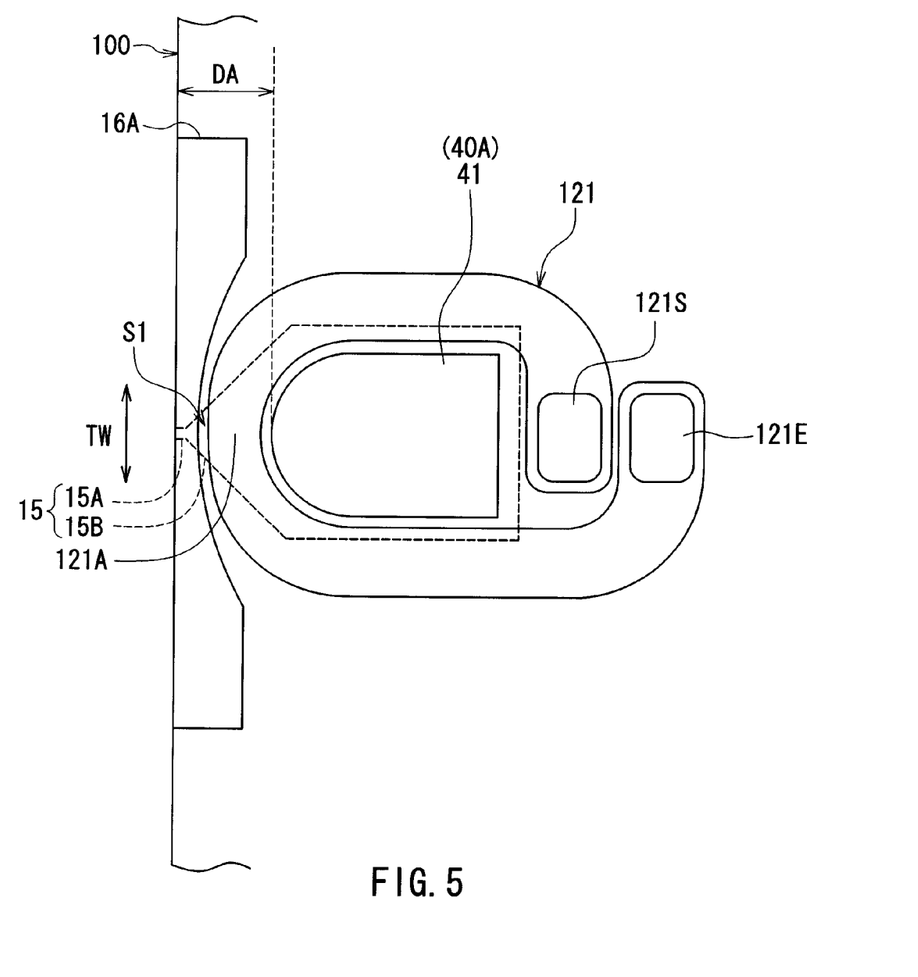
FIG. 5 is a plan view showing a first layer of a first portion of the coil in the magnetic head according to the first embodiment of the invention.
Figure 6:
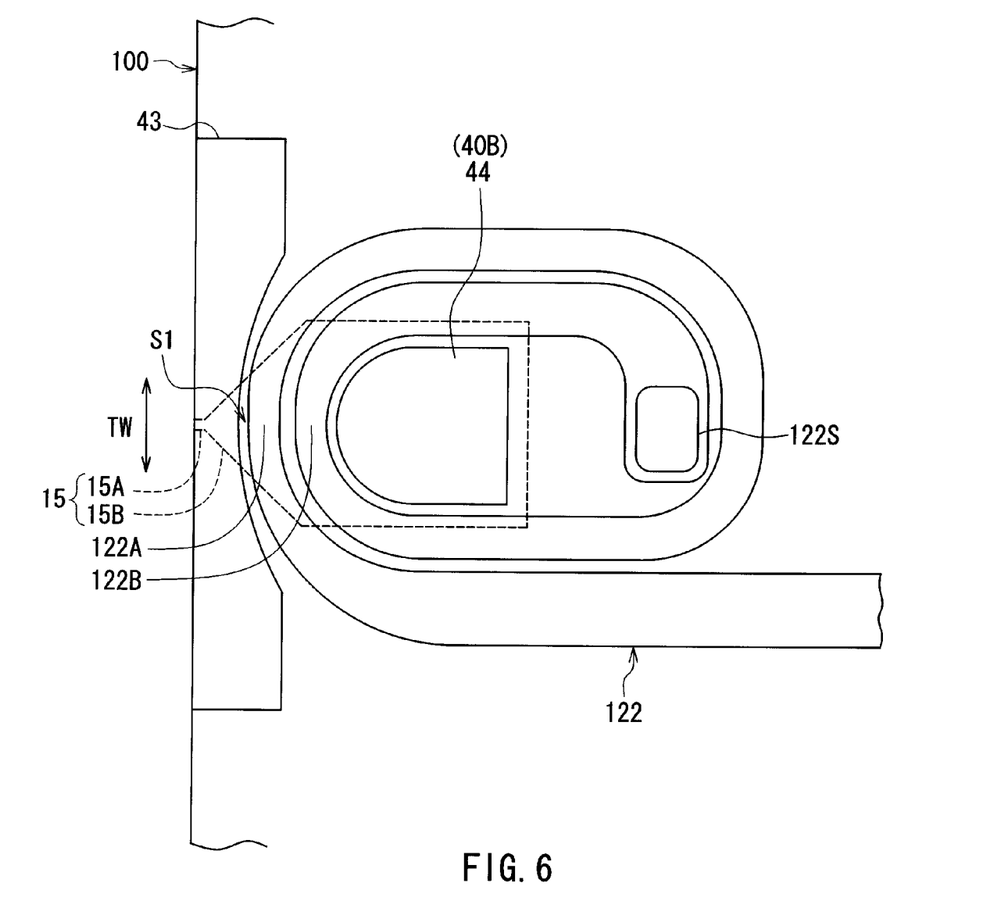
FIG. 6 is a plan view showing a second layer of the first portion of the coil in the magnetic head according to the first embodiment of the invention.

Embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view of the magnetic head according to the present embodiment. FIG. 2 is a front view showing the medium facing surface of the magnetic head according to the present embodiment. FIG. 3 is a cross-sectional view showing a part of a main pole in the vicinity of the medium facing surface in the magnetic head according to the present embodiment. FIG. 4 is a plan view showing a second portion of a coil of the magnetic head according to the present embodiment. FIG. 5 is a plan view showing a first layer of a first portion of the coil of the magnetic head according to the present embodiment. FIG. 6 is a plan view showing a second layer of the first portion of the coil of the magnetic head according to the present embodiment. The arrow drawn within the magnetic head in FIG. 1 indicates the flow of magnetic flux. The arrow with the symbol T in each of FIG. 1 and FIG. 3 indicates the direction of travel of a recording medium. The arrow with the symbol TW in each of FIG. 2 and FIG. 4 to FIG. 6 indicates the track width direction.

As shown in FIG. 1 and FIG. 2, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 100 that faces a recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes a nonmagnetic layer 50 made of a nonmagnetic material and disposed on the second read shield layer 7, and a write head section 9 disposed on the nonmagnetic layer 50. The nonmagnetic layer 50 is made of alumina, for example. The write head section 9 includes a coil, a main pole 15, a write shield 16, and a gap part 17.

The coil produces a magnetic field corresponding to data to be written on a recording medium. The coil includes a first portion 120 and a second portion 110. The first portion 120 and the second portion 110 are both made of a conductive material such as copper. The first portion 120 and the second portion 110 are connected in series or in parallel. The main pole 15 has an end face located in the medium facing surface 100. The main pole 15 allows a magnetic flux corresponding to the magnetic field produced by the coil to pass, and produces a write magnetic field for writing data on the recording medium by means of a perpendicular magnetic recording system. FIG. 1 and FIG. 3 each show a cross section that intersects the end face of the main pole 15 located in the medium facing surface 100 and that is parallel to the direction T of travel of the recording medium and perpendicular to the medium facing surface 100 (this cross section will hereinafter be referred to as the main cross section).

The write shield 16 has an end face located in the medium facing surface 100. The end face of the write shield 16 includes first to fourth end face portions 16Aa, 16Ba, 16Ca, and 16Da. The first end face portion 16Aa is located forward of the end face of the main pole 15 in the direction T of travel of the recording medium. The second end face portion 16Ba is located backward of the end face of the main pole 15 in the direction T of travel of the recording medium. The third and fourth end face portions 16Ca and 16Da are located on opposite sides of the end face of the main pole 15 in the track width direction TW. In the medium facing surface 100, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head section 9 further includes a first return path section 40 and a second return path section 30. The first return path section 40 and the second return path section 30 are both made of a magnetic material. Examples of materials that can be used for the first return path section 40 and the second return path section 30 include CoFeN, CoNiFe, NiFe, and CoFe. The first return path section 40 and the second return path section 30 align along a direction perpendicular to the top surface 1a of the substrate 1 with the main pole 15 interposed therebetween. The first return path section 40 is located forward of the main pole 15 in the direction T of travel of the recording medium, and connects the write shield 16 and part of the main pole 15 away from the medium facing surface 100 to each other, thereby magnetically coupling the write shield 16 and the main pole 15 to each other. The second return path section 30 is located backward of the main pole 15 in the direction T of travel of the recording medium, and connects the write shield 16 and part of the main pole 15 away from the medium facing surface 100 to each other, thereby magnetically coupling the write shield 16 and the main pole 15 to each other.

The second return path section 30 includes magnetic layers 31, 32, 33, 34, 35, and 36. The magnetic layer 31 is located on the nonmagnetic layer 50. The magnetic layers 32 and 33 are both located on the magnetic layer 31. The magnetic layer 32 is located near the medium facing surface 100. The magnetic layer 33 is located farther from the medium facing surface 100 than is the magnetic layer 32. Each of the magnetic layers 31 and 32 has an end face that faces toward the medium facing surface 100, the end face being located at a distance from the medium facing surface 100. As shown in FIG. 4, the second portion 110 of the coil is wound approximately three turns around the magnetic layer 33.

The magnetic head further includes: an insulating layer 51 made of an insulating material, disposed on the nonmagnetic layer 50 and surrounding the magnetic layer 31; an insulating film 52 made of an insulating material and interposed between the second portion 110 and the magnetic layers 31 to 33; an insulating layer 53 made of an insulating material and disposed in the space between adjacent turns of the second portion 110; and an insulating layer 54 made of an insulating material and disposed around the second portion 110 and the magnetic layer 32. The top surfaces of the second portion 110, the magnetic layers 32 and 33, the insulating film 52, and the insulating layers 53 and 54 are even with each other. The insulating layers 51 and 54 and the insulating film 52 are made of alumina, for example. The insulating layer 53 is made of photoresist, for example.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located forward of the main pole 15 in the direction T of travel of the recording medium. The second shield 16B is located backward of the main pole 15 in the direction T of travel of the recording medium. The side shields 16C and 16D magnetically couple the first shield 16A and the second shield 16B to each other.

As shown in FIG. 3, the first shield 16A includes the first end face portion 16Aa, and a bottom surface including a first slope 16Ab. The second shield 16B includes the second end face portion 16Ba and a second slope 16Bb. The second slope 16Bb serves as a top surface. The first slope 16Ab and the second slope 16Bb will be described in detail later. As shown in FIG. 2, the side shield 16C includes the third end face portion 16Ca. The side shield 16D includes the fourth end face portion 16Da.

The magnetic layer 34 is disposed on the magnetic layer 32 and the insulating layer 54. The magnetic layer 35 is disposed on the magnetic layer 33. The magnetic head further includes an insulating layer 55 made of an insulating material and disposed over the top surfaces of the second portion 110, the insulating film 52 and the insulating layers 53 and 54, and an insulating layer 56 made of an insulating material, disposed on the insulating layer 55 and surrounding the magnetic layers 34 and 35. The top surfaces of the magnetic layers 34 and 35 and the insulating layer 56 are even with each other. The insulating layers 55 and 56 are made of alumina, for example.

The second shield 16B is disposed on the magnetic layer 34. The magnetic layer 36 is disposed on the magnetic layer 35. The magnetic head further includes a nonmagnetic layer 57 made of a nonmagnetic material. The nonmagnetic layer 57 is disposed on part of the top surface of the magnetic layer 34 and on the top surface of the insulating layer 56, and surrounds the second shield 16B and the magnetic layer 36. The nonmagnetic layer 57 is made of alumina, for example. The top surface of the nonmagnetic layer 57 includes a slope UL1 continuous with the second slope 16Bb, and a bottom part UL2 that is continuous with the slope UL1 and is located farther from the medium facing surface 100 than is the slope UL1.

The main pole 15 has a top surface 15T (see FIG. 3), which is a surface located at a forward end in the direction T of travel of the recording medium, and has a bottom end 15L (see FIG. 3) opposite to the top surface 15T. The main pole 15 further has first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

The side shields 16C and 16D are disposed on the second shield 16B and in contact with the second slope 16Bb of the second shield 16B. The second gap layer 18 is arranged to extend along the sidewalls of the side shields 16C and 16D, the second slope 16Bb of the second shield 16B, and the top surface of the nonmagnetic layer 57. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18. The second gap layer 18 has an opening for exposing the top surface of the magnetic layer 36.

The main pole 15 is disposed over the second shield 16B and the nonmagnetic layer 57 such that the second gap layer 18 is interposed between the main pole 15 and each of the second slope 16Bb of the second shield 16B and the top surface of the nonmagnetic layer 57. As shown in FIG. 2, the second gap layer 18 is interposed also between the main pole 15 and each of the side shields 16C and 16D.

The bottom end 15L of the main pole 15 is in contact with the top surface of the magnetic layer 36 at a position away from the medium facing surface 100. The main pole 15 is made of a magnetic metal material. Examples of materials that can be used for the main pole 15 include NiFe, CoNiFe, and CoFe. The shape of the main pole 15 will be described in detail later.

The magnetic head further includes a first nonmagnetic layer (not shown) made of a nonmagnetic material and disposed around the main pole 15 and the side shields 16C and 16D. In the present embodiment, the first nonmagnetic layer is made of a nonmagnetic insulating material such as alumina, in particular.

The magnetic head further includes: a nonmagnetic metal layer 58 made of a nonmagnetic metal material and disposed on part of the top surface 15T of the main pole 15 at a position away from the medium facing surface 100; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58, and the insulating layer 59. The material employed for the first gap layer 19 may be a nonmagnetic insulating material such as alumina, or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 100, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The first return path section 40 includes magnetic layers 41, 43, 44, and 45. The magnetic layer 41 is disposed on the main pole 15 at a position away from the medium facing surface 100.

The first portion 120 of the coil includes a first layer 121 and a second layer 122. As shown in FIG. 5, the first layer 121 is wound one turn around the magnetic layer 41. The magnetic head further includes an insulating film 61 made of an insulating material and interposed between the first layer 121 and each of the first shield 16A, the first gap layer 19 and the magnetic layer 41, and a second nonmagnetic layer (not shown) made of a nonmagnetic material and disposed around the first layer 121 and the first shield 16A. The insulating film 61 is made of alumina, for example. The second nonmagnetic layer is made of an inorganic insulating material, for example. The inorganic insulating material is alumina or silicon oxide, for example. The top surfaces of the first shield 16A, the first layer 121, the magnetic layer 41, the insulating film 61, and the second nonmagnetic layer are even with each other.

The magnetic head further includes an insulating layer 62 made of an insulating material and disposed over the top surfaces of the first layer 121 and the insulating film 61 and part of the top surface of the magnetic layer 41. The insulating layer 62 is made of alumina, for example.

The magnetic layer 43 is disposed over the first shield 16A and the insulating layer 62. The magnetic layer 44 is disposed on the magnetic layer 41. The magnetic layer 43 has a front end face located in the medium facing surface 100, a top surface extending in a direction substantially perpendicular to the medium facing surface 100, and first and second connecting surfaces that connect the front end face and the top surface to each other. In the magnetic layer 43, an end of the first connecting surface is located in the medium facing surface 100, the other end of the first connecting surface is connected to an end of the second connecting surface, and the other end of the second connecting surface is connected to the top surface. The distance from the top surface 1a of the substrate 1 to an arbitrary point on the first connecting surface increases with increasing distance from the arbitrary point to the medium facing surface 100. The second connecting surface is parallel to the medium facing surface 100.

As shown in FIG. 6, the second layer 122 is wound approximately two turns around the magnetic layer 44. The magnetic head further includes an insulating film 64 made of an insulating material and interposed between the second layer 122 and each of the magnetic layers 43 and 44 and the insulating layer 62, an insulating layer 65 made of an insulating material and disposed in the space between adjacent turns of the second layer 122, and an insulating layer 66 made of an insulating material and disposed around the second layer 122 and the magnetic layer 43. The top surfaces of the second layer 122, the magnetic layers 43 and 44, the insulating film 64, and the insulating layers 65 and 66 are even with each other. The magnetic head further includes an insulating layer 67 made of an insulating material and disposed over the top surfaces of the second layer 122, the insulating film 64 and the insulating layer 65. The insulating film 64 and the insulating layers 66 and 67 are made of alumina, for example. The insulating layer 65 is made of photoresist, for example.

The magnetic layer 45 is disposed over the magnetic layers 43 and 44 and the insulating layer 67, and connects the magnetic layer 43 and the magnetic layer 44 to each other. The magnetic layer 45 has an end face facing toward the medium facing surface 100. This end face is located at a distance from the medium facing surface 100. The magnetic head further includes an insulating layer 68 made of an insulating material and disposed around the magnetic layer 45. The insulating layer 68 is made of alumina, for example. The top surfaces of the magnetic layer 45 and the insulating layer 68 are even with each other.

The magnetic head further includes a protective layer 70 made of a nonmagnetic material and disposed to cover the write head section 9. The protective layer 70 is made of, for example, an inorganic insulating material such as alumina.

As has been described, the magnetic head according to the present embodiment includes the medium facing surface 100, the read head section 8, and the write head section 9. The medium facing surface 100 faces a recording medium. The read head section 8 and the write head section 9 are stacked on the substrate 1. Relative to the write head section 9, the read head section 8 is located backward in the direction T of travel of the recording medium (i.e., located on the leading side).

The write head section 9 includes the coil including the first portion 120 and the second portion 110, the main pole 15, the write shield 16, the gap part 17, the first return path section 40, and the second return path section 30. The write shield 16 includes the first shield 16A, the second shield 16B, and the two side shields 16C and 16D. The gap part 17 is composed of part of the first gap layer 19 and part of the second gap layer 18. The first return path section 40 and the second return path section 30 align along the direction perpendicular to the top surface 1a of the substrate 1 with the main pole 15 interposed therebetween.

The first return path section 40 includes the magnetic layers 41 and 43 to 45, and is located forward of the main pole 15 in the direction T of travel of the recording medium. As shown in FIG. 1, the first return path section 40 connects the write shield 16 and part of the main pole 15 away from the medium facing surface 100 to each other so that a first space S1 is defined by the main pole 15, the gap part 17 (the gap layer 19), the write shield 16, and the first return path section 40 (the magnetic layers 41 and 43 to 45).

The second return path section 30 includes the magnetic layers 31 to 36, and is located backward of the main pole 15 in the direction T of travel of the recording medium. As shown in FIG. 1, the second return path section 30 connects the write shield 16 and part of the main pole 15 away from the medium facing surface 100 to each other so that a second space S2 is defined by the main pole 15, the gap part 17 (the gap layer 18), the write shield 16, and the second return path section 30 (the magnetic layers 31 to 36).

The first portion 120 and the second portion 110 of the coil and the first return path section 40 will now be described in detail with reference to FIG. 1 and FIG. 4 to FIG. 6. FIG. 4 is a plan view showing the second portion 110. The second portion 110 is wound approximately three turns around the magnetic layer 33 which constitutes part of the second return path section 30. The second portion 110 includes three coil elements 110A, 110B, and 110C extending to pass between the magnetic layer 32 and the magnetic layer 33, in particular, within the second space S2. Note that the coil elements refer to part of the coil winding. The coil elements 110A, 110B, and 110C align in this order in the direction perpendicular to the medium facing surface 100, the coil element 110A being closest to the medium facing surface 100. The second portion 110 has a coil connection part 110E electrically connected to the first portion 120.

FIG. 5 is a plan view showing the first layer 121 of the first portion 120. The first layer 121 is wound one turn around the magnetic layer 41 which constitutes part of the first return path section 40. The first layer 121 includes a coil element 121A extending to pass between the first shield 16A and the magnetic layer 41, in particular, within the first space S1. The first layer 121 has a coil connection part 121S electrically connected to the coil connection part 110E of the second portion 110, and a coil connection part 121E electrically connected to the second layer 122. The coil connection part 121S is electrically connected to the coil connection part 110E via a connection layer (not shown) of columnar shape that penetrates a plurality of layers interposed between the first layer 121 and the second portion 110. The connection layer is made of a conductive material such as copper.

FIG. 6 is a plan view showing the second layer 122 of the first portion 120. The second layer 122 is wound approximately two turns around the magnetic layer 44 which constitutes part of the first return path section 40. The second layer 122 includes two coil elements 122A and 122B extending to pass between the magnetic layer 43 and the magnetic layer 44, in particular, within the first space S1. The coil elements 122A and 122B align in this order in the direction perpendicular to the medium facing surface 100, the coil element 122A being closer to the medium facing surface 100. The second layer 122 has a coil connection part 122S penetrating the insulating layer 62 and the insulating film 64 and electrically connected to the coil connection part 121E of the first layer 121. In the example shown in FIG. 4 to FIG. 6, the first portion 120 and the second portion 110 are connected in series.

The coil elements 121A, 122A, and 122B each extend to pass through the first space S1. The coil elements 122A and 122B are located forward of the coil element 121A in the direction T of travel of the recording medium. The coil element 121A corresponds to the at least one first coil element according to the invention. The coil elements 122A and 122B correspond to the plurality of second coil elements according to the invention.

The second coil element 122B is located farther from the medium facing surface 100 than the second coil element 122A. As shown in FIG. 1, the first coil element 121A has an end portion E1, and the second coil element 122B has an end portion E2. The end portion E1 is located at the farthest position from the medium facing surface 100 in the first coil element 121A. The end portion E2 is located at the farthest position from the medium facing surface 100 in the plurality of second coil elements 122A and 122B. In the main cross section, the end portion E1 is closer to the medium facing surface 100 than is the end portion E2. The end portion E1 corresponds to the claimed end portion of the at least one first coil element. The end portion E2 corresponds to the claimed end portion of the plurality of second coil elements.

The coil elements 110A, 110B, and 110C each extend to pass through the second space S2. The coil elements 110A, 110B, and 110C correspond to the at least one third coil element according to the invention.

The first return path section 40 includes: a first portion 40A located such that the first coil element 121A is interposed between the first portion 40A and the medium facing surface 100; and a second portion 40B located such that the second coil elements 122A and 122B are interposed between the second portion 40B and the medium facing surface 100. In the present embodiment, the first portion 40A is composed of the magnetic layer 41, and the second portion 40B is composed of the magnetic layer 44. The second portion 40B (the magnetic layer 44) is located forward of the first portion 40A (the magnetic layer 41) in the direction T of travel of the recording medium.

As shown in FIG. 1, the first portion 40A (the magnetic layer 41) has an end portion E3, and the second portion 40B (the magnetic layer 44) has an end portion E4. The end portion E3 is located at the closest position to the medium facing surface 100 in the first portion 40A. The end portion E4 is located at the closest position to the medium facing surface 100 in the second portion 40B. In the main cross section, the end portion E3 is closer to the medium facing surface 100 than the end portion E4. The end portion E3 corresponds to the claimed end portion of the first portion. The end portion E4 corresponds to the claimed end portion of the second portion. Here, as shown in FIG. 5, the minimum distance between the first portion 40A and the medium facing surface 100 will be represented by the symbol DA. The distance DA preferably falls within the range of 0.8 to 4.0 μm, and more preferably within the range of 1.5 to 3.5 μm.

The shape of the main pole 15 will now be described in detail with reference to FIG. 2 to FIG. 6. As shown in FIG. 4 to FIG. 6, the main pole 15 includes a track width defining portion 15A and a wide portion 15B. The track width defining portion 15A has an end face located in the medium facing surface 100, and an end opposite to the end face. The wide portion 15B is connected to the end of the track width defining portion 15A. As shown in FIG. 2 and FIG. 3, the main pole 15 has: the top surface 15T which is the surface located at the forward end in the direction T of travel of the recording medium; the bottom end 15L opposite to the top surface 15T; the first side part; and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 100. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 100, then becoming constant. Here, the length of the track width defining portion 15A in the direction perpendicular to the medium facing surface 100 will be referred to as the neck height. The neck height falls within the range of 0 to 0.3 μm, for example. A zero neck height means that no track width defining portion 15A exists and an end face of the wide portion 15B is thus located in the medium facing surface 100.

The top surface 15T includes a first portion 15T1 and a second portion 15T2 that are arranged in this order of increasing distance from the medium facing surface 100. The first portion 15T1 has a first end located in the medium facing surface 100 and a second end opposite to the first end. The second portion 15T2 is connected to the second end of the first portion 15T1.

The bottom end 15L includes a third portion 15L1 and a fourth portion 15L2 that are arranged in this order of increasing distance from the medium facing surface 100. The third portion 15L1 has a first end located in the medium facing surface 100 and a second end opposite to the first end. The third portion 15L1 may be an edge formed by two intersecting planes, or may be a plane connecting two planes to each other. The fourth portion 15L2 is a plane connected to the second end of the third portion 15L1.

Here, as shown in FIG. 3, assume a first virtual plane P1 and a second virtual plane P2. The first virtual plane P1 passes through the first end of the first portion 15T1 and is perpendicular to the medium facing surface 100 and to the direction T of travel of the recording medium. The second virtual plane P2 passes through the first end of the third portion 15L1 and is perpendicular to the medium facing surface 100 and to the direction T of travel of the recording medium. The first portion 15T1 is inclined relative to the first virtual plane P1 and the medium facing surface 100 such that the second end of the first portion 15T1 is located forward of the first virtual plane P1 in the direction T of travel of the recording medium. The third portion 15L1 is inclined relative to the second virtual plane P2 and the medium facing surface 100 such that the second end of the third portion 15L1 is located backward of the second virtual plane P2 in the direction T of travel of the recording medium.

As mentioned previously, the first shield 16A of the write shield 16 includes the bottom surface including the first slope 16Ab. The first slope 16Ab includes a portion that is opposed to the first portion 15T1 with the first gap layer 19 of the gap part 17 interposed therebetween. The first slope 16Ab is inclined relative to the first virtual plane P1 and the medium facing surface 100.

The second shield 16B of the write shield 16 includes the second slope 16Bb serving as the top surface. The second slope 16Bb is opposed to the third portion 15L1 with the second gap layer 18 of the gap part 17 interposed therebetween. The second slope 16Bb is inclined relative to the second virtual plane P2 and the medium facing surface 100. The nonmagnetic layer 57 includes the slope UL1 and the bottom part UL2. The slope UL1 is continuous with the second slope 16Bb and inclined relative to the second virtual plane P2 and the medium facing surface 100. The third portion 15L1 is opposed to the second slope 16Bb and the slope UL1 with the second gap layer 18 of the gap part 17 interposed between the third portion 15L1 and each of the second slope 16Bb and the slope UL1.

Here, as shown in FIG. 3, the length of the first portion 15T1 in the direction perpendicular to the medium facing surface 100 will be represented by the symbol $L_A$, the length of the third portion 15L1 in the direction perpendicular to the medium facing surface 100 will be represented by the symbol $L_B$, the length of the first slope 16Ab in the direction perpendicular to the medium facing surface 100 will be represented by the symbol $L_C$, and the length of the second slope 16Bb in the direction perpendicular to the medium facing surface 100 will be represented by the symbol $L_D$. The length $L_A$ is smaller than the lengths $L_B$ and $L_C$. The length $L_D$ is smaller than the length $L_B$. The length $L_A$ falls within the range of 0.05 to 0.15 μm, for example. The length $L_B$ falls within the range of 0.2 to 1.2 μm, for example. The length $L_C$ falls within the range of 0.2 to 0.6 μm, for example. The length $L_D$ falls within the range of 0.1 to 0.5 μm, for example.

The neck height, i.e., the distance from the medium facing surface 100 to the boundary between the track width defining portion 15A and the wide portion 15B may be equal to or different from the length $L_A$ of the first portion 15T1 or the length $L_B$ of the third portion 15L1.

As shown in FIG. 3, the angle of inclination of the first portion 15T1 relative to the first virtual plane P1 will be represented by the symbol $\theta_{T1}$, and the angle of inclination of the third portion 15L1 relative to the second virtual plane P2 will be represented by the symbol $\theta_{L1}$. The angle of inclination $\theta_{T1}$ falls within the range of 22° to 35°, for example. The angle of inclination $\theta_{L1}$ falls within the range of 30° to 50°, for example.

The second portion 15T2 and the fourth portion 15L2 extend in a direction substantially perpendicular to the medium facing surface 100. As shown in FIG. 3, the thickness of the main pole 15 in the medium facing surface 100, i.e., the distance between the first virtual plane P1 and the second virtual plane P2, will be represented by the symbol D0. The distance between the second portion 15T2 and the first virtual plane P1 will be represented by the symbol D1. The distance between the fourth portion 15L2 and the second virtual plane P2 will be represented by the symbol D2. The distance D2 is greater than the distance D1. The distance D0 falls within the range of 0.05 to 0.1 μm, for example. The distance D1 falls within the range of 0.02 to 0.1 μm, for example. The distance D2 falls within the range of 0.2 to 0.8 μm, for example.

The end face of the main pole 15 located in the medium facing surface 100 has a first side adjacent to the first gap layer 19, a second side connected to a first end of the first side, and a third side connected to a second end of the first side. The first side defines the track width. The position of an end of a record bit to be recorded on a recording medium depends on the position of the first side. The end face of the main pole 15 located in the medium facing surface 100 decreases in width in the track width direction TW with increasing proximity to the bottom end 15L of the main pole 15, that is, with increasing proximity to the second virtual plane P2. Each of the second side and the third side forms an angle of, for example, 7° to 17°, or preferably 10° to 15°, relative to a direction perpendicular to the second virtual plane P2. The first side has a length in the range of 0.05 to 0.20 μm, for example.

The function and effects of the magnetic head according to the present embodiment will now be described. The magnetic head writes data on a recording medium by using the write head section 9 and reads data stored on the recording medium by using the read head section 8. In the write head section 9, the coil including the first portion 120 and the second portion 110 produces magnetic fields corresponding to data to be written on the recording medium. A magnetic flux corresponding to the magnetic field produced by the first portion 120 passes through the first return path section 40 and the main pole 15. A magnetic flux corresponding to the magnetic field produced by the second portion 110 passes through the second return path section 30 and the main pole 15. Consequently, the main pole 15 allows the magnetic flux corresponding to the magnetic field produced by the first portion 120 and the magnetic flux corresponding to the magnetic field produced by the second portion 110 to pass.

The first portion 120 and the second portion 110 may be connected in series or in parallel. In either case, the first portion 120 and the second portion 110 are connected such that the magnetic flux corresponding to the magnetic field produced by the first portion 120 and the magnetic flux corresponding to the magnetic field produced by the second portion 110 flow in the same direction through the main pole 15.

The main pole 15 allows the magnetic fluxes corresponding to the magnetic fields produced by the coil to pass as mentioned above, and produces a write magnetic field for writing data on a recording medium by means of the perpendicular magnetic recording system.

The write shield 16 captures a disturbance magnetic field applied to the magnetic head from the outside thereof. This makes it possible to prevent erroneous writing on a recording medium induced by the disturbance magnetic field intensively captured into the main pole 15. The write shield 16 also functions to capture a magnetic flux that is produced from the end face of the main pole 15 and spreads in directions other than the direction perpendicular to the plane of the recording medium, and to thereby prevent the magnetic flux from reaching the recording medium.

Furthermore, the write shield 16, the first return path section 40, and the second return path section 30 function to allow a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 40. Another part of the magnetic flux that has been produced from the end face of the main pole 15 and has magnetized the recording medium flows back to the main pole 15 through the write shield 16 and the second return path section 30.

The write shield 16 includes the first shield 16A, the second shield 16B, and the two side shields 16C and 16D. The present embodiment thus makes it possible that, in regions both forward and backward of the end face of the main pole 15 in the direction T of travel of the recording medium and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 2, the present embodiment is configured so that in the medium facing surface 100, the distance between the first and second side parts of the main pole 15 in the track width direction TW, i.e., the width of the end face of the main pole 15, decreases with increasing proximity to the second virtual plane P2. According to the present embodiment, this feature also serves to prevent adjacent track erasure induced by a skew.

The present embodiment is also configured so that in the medium facing surface 100, the distance between the first and second sidewalls of the side shields 16C and 16D in the track width direction TW decreases with increasing proximity to the second virtual plane P2, as does the distance between the first and second side parts of the main pole 15. The present embodiment thus allows both the distance between the first side part and the first sidewall and the distance between the second side part and the second sidewall to be small and constant in the medium facing surface 100. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 40 (the magnetic layers 41 and 43 to 45) which magnetically couples the first shield 16A of the write shield 16 and the main pole 15 to each other, and the second return path section 30 (the magnetic layers 31 to 36) which magnetically couples the second shield 16B of the write shield 16 and the main pole 15 to each other. Such a configuration allows the magnetic flux captured by the write shield 16 to flow into the main pole 15 by way of the first return path section 40 and the second return path section 30. In the present embodiment, the first return path section 40, the second return path section 30 and the main pole 15, which are magnetic layers large in volume, are magnetically connected to the write shield 16. This allows the write shield 16 to capture much magnetic flux, so that the above-described effect of the write shield 16 can be exerted effectively.

Additionally, as the frequency of a recording signal is increased in order to increase the recording density, the magnetic head is required to be improved in the rate of change in the direction of the magnetic flux produced from the end face of the main pole 15. The position of an end of a record bit depends on the position of an end of the end face of the main pole 15 located in the medium facing surface 100, the end being located forward in the direction T of travel of the recording medium. To increase the recording density, it is therefore required to improve the rate of change in the direction of the magnetic flux passing through the first shield 16A as well as to improve the rate of change in the direction of the magnetic flux produced from the end face of the main pole 15. To meet these requirements, it is effective to reduce the length of a magnetic path that passes through the first shield 16A and the main pole 15. In the present embodiment, there is provided the first return path section 40 for connecting the main pole 15 and the first shield 16A to each other. This allows the length of the aforementioned magnetic path to be shorter than in the case where the first return path section 40 is not provided.

Furthermore, the present embodiment is configured so that in the main cross section, the end portion E3 of the first portion 40A (the magnetic layer 41) of the first return path section 40 that is located at the closest position to the medium facing surface 100 in the first portion 40A is closer to the medium facing surface 100 than is the end portion E4 of the second portion 40B (the magnetic layer 44) of the first return path section 40 that is located at the closest position to the medium facing surface 100 in the second portion 40B. For the reasons discussed below, this feature of the present embodiment makes it possible to reduce the length of a magnetic path that passes through the first return path section 40 and the main pole 15 while ensuring sufficient magnetomotive force of the coil.

The first portion 120 of the coil is wound around the first and second portions 40A and 40B (the magnetic layers 41 and 44) each of which constitutes part of the first return path section 40. In order to ensure sufficient magnetomotive force of the coil or the first portion 120 in particular, the first portion 120 needs to be wound at least approximately two turns. That is, two or more coil elements need to pass through the first space S1. On the other hand, in order to reduce the length of the magnetic path passing through the first return path section 40 and the main pole 15, it is necessary to make the minimum distance DA between the first portion 40A and the medium facing surface 100 smaller.

Here, a case will be contemplated where the number of the first coil elements is equal to or greater than the number of the second coil elements and the end portion E3 is located at the same position as the end portion E4 in the direction perpendicular to the medium facing surface 100 or at a position farther from the medium facing surface 100 than is the position of the end portion E4. In this case, a magnetic flux flowing from the first return path section 40 toward the main pole 15 gets farther from the medium facing surface 100 as it approaches the main pole 15, and the direction of this magnetic flux changes at a great angle of 90° or more in the vicinity of the interface between the first return path section 40 and the main pole 15 (the interface between the magnetic layer 41 and the main pole 15). This may induce leakage of magnetic flux in the vicinity of the aforementioned interface, and thereby hinder the main pole 15 from producing a write magnetic field of sufficient magnitude.

In contrast, according to the present embodiment, since the end portions E3 and E4 are in the above-described positional relationship, there occurs no great change in the direction of the magnetic flux flowing from the second portion 40B (the magnetic layer 44) toward the main pole 15 by way of the first portion 40A (the magnetic layer 41), as shown in FIG. 1. The present embodiment thus makes it possible to prevent leakage of magnetic flux from the vicinity of the first and second portions 40A and 40B (the magnetic layers 41 and 44) to the outside.

Furthermore, according to the present embodiment, since the end portions E3 and E4 are in the above-described positional relationship, it is possible to make the number of the second coil elements greater than the number of the first coil element(s) and thereby increase the magnetomotive force of the coil, while making the minimum distance DA between the first portion 40A and the medium facing surface 100 smaller. The present embodiment allows the minimum distance DA between the first portion 40A and the medium facing surface 100 to fall within the range of 0.8 to 4.0 μm.

Consequently, according to the present embodiment, it is possible to allow the main pole 15 to produce a write magnetic field of sufficient magnitude while reducing the length of the magnetic path passing through the first return path section 40, which is located forward of the main pole 15 in the direction T of travel of the recording medium, and the main pole 15.

In the present embodiment, the top surface 15T of the main pole 15 includes the first portion 15T1 inclined relative to the first virtual plane P1 and the medium facing surface 100, while the bottom end 15L of the main pole 15 includes the third portion 15L1 inclined relative to the second virtual plane P2 and the medium facing surface 100. The main pole 15 of such a shape allows the prevention of adjacent track erasure induced by a skew because the main pole 15 has a small thickness in the medium facing surface 100. On the other hand, since a part of the main pole 15 away from the medium facing surface 100 has a large thickness, it is possible for the main pole 15 to direct much magnetic flux to the medium facing surface 100, and this makes it possible to improve write characteristics such as the overwrite property.

In the present embodiment, the length $L_A$ of the first portion 15T1 in the direction perpendicular to the medium facing surface 100 is smaller than the length $L_C$ of the first slope 16Ab in the direction perpendicular to the medium facing surface 100. If the length $L_A$ is equal to the length $L_C$ shown in FIG. 3, the first portion 15T1 and the first slope 16Ab are opposed to each other over a large area with a small spacing therebetween. This leads to a problem that a large amount of magnetic flux leaks from the main pole 15 to the first shield 16A, and causes degradation in write characteristics such as the overwrite property. To prevent this, the length $L_C$ may be reduced to make the relationship between the lengths $L_A$ and $L_C$ opposite to that shown in FIG. 3. This, however, reduces the volume of the first shield 16A of the write shield 16 which is located forward of the main pole 15 in the direction T of travel of the recording medium, and thereby compromises the function of the write shield. More specifically, a reduction in the volume of the first shield 16A is likely to cause magnetic flux saturation in the first shield 16A. This in turn leads to magnetic flux leakage from the first shield 16A to the medium facing surface 100, raising a problem that the magnetic flux leakage may result in accidental erasure of data stored on the recording medium.

In the present embodiment, the length $L_A$ is made smaller than the length $L_C$ to allow the first portion 15T1 and the first slope 16Ab to be opposed to each other over a smaller area.

This makes it possible to prevent magnetic flux leakage from the main pole 15 to the first shield 16A without compromising the function of the write shield 16. However, this causes the distance D1 between the second portion 15T2 and the first virtual plane P1 to be small, and cannot therefore serve to sufficiently increase the thickness of a portion of the main pole 15 located away from the medium facing surface 100.

To cope with this, in the present embodiment, the distance D2 between the fourth portion 15L2 and the second virtual plane P2 is made greater than the distance D1 between the second portion 15T2 and the first virtual plane P1, and the length $L_A$ of the first portion 15T1 is made smaller than the length $L_B$ of the third portion 15L1. This makes it possible to reduce the thickness of the main pole 15 in the medium facing surface 100 and to sufficiently increase the thickness of a portion of the main pole 15 that is located farther from the medium facing surface 100 than is the third portion 15L1, while preventing magnetic flux leakage from the main pole 15 to the first shield 16A as described above. According to the present embodiment, it is thereby possible to prevent the skew-induced problems and provide improved write characteristics.

Furthermore, in the present embodiment, the length $L_D$ of the second slope 16Bb is smaller than the length $L_B$ of the third portion 15L1. According to the present embodiment, this allows the third portion 15L1 and the second slope 16Bb to be opposed to each other over a smaller area, thereby allowing prevention of magnetic flux leakage from the main pole 15 to the second shield 16B. Note that since the length $L_B$ of the third portion 15L1 can be sufficiently increased, it is possible to prevent the volume of the second shield 16B from being excessively reduced even if the length $L_D$ is made smaller than the length $L_B$.

Consequently, according to the present embodiment, it is possible to prevent the skew-induced problems and provide improved write characteristics without compromising the function of the write shield 16.

Second Embodiment

Figure 7:
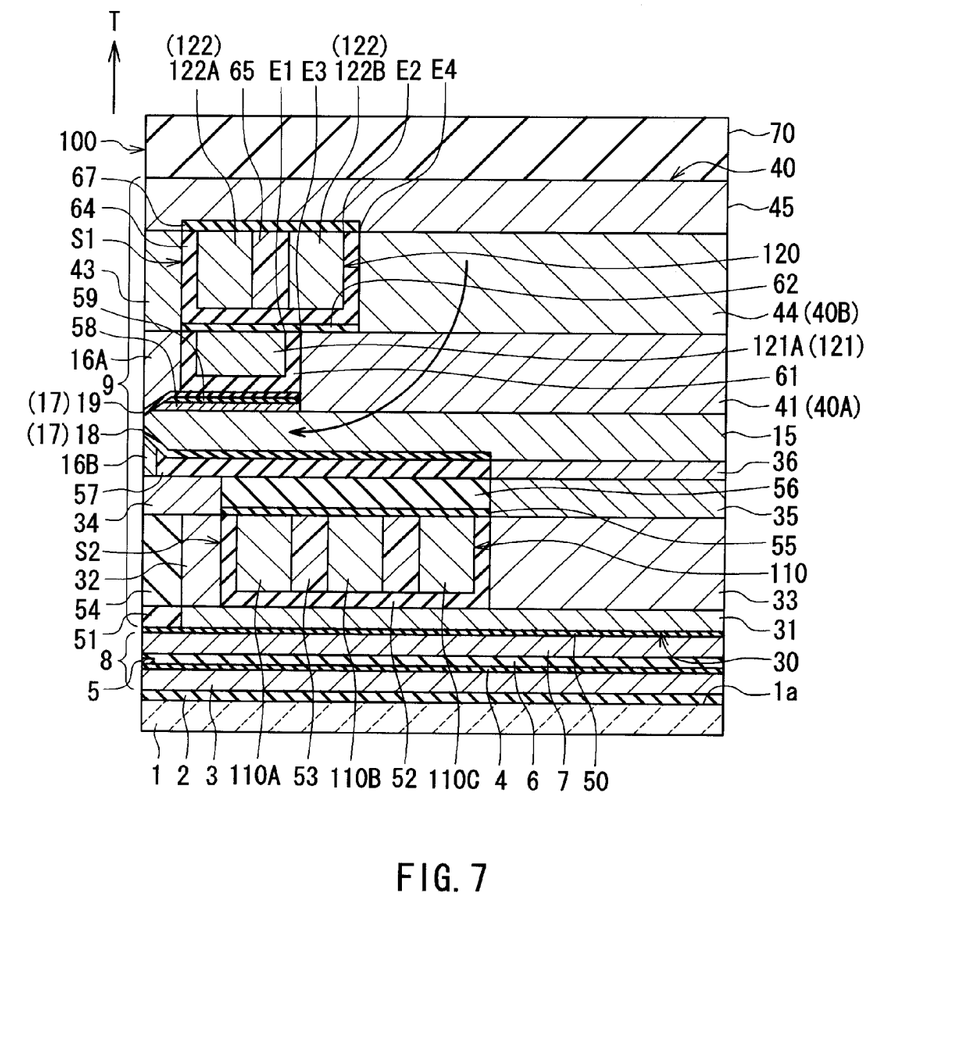
FIG. 7 is a cross-sectional view of a magnetic head according to a second embodiment of the invention.

A magnetic head according to a second embodiment of the invention will now be described with reference to FIG. 7. FIG. 7 is a cross-sectional view of the magnetic head according to the present embodiment. Note that FIG. 7 shows the main cross section. The arrow drawn within the magnetic head in FIG. 7 indicates the flow of magnetic flux.

The magnetic head according to the present embodiment is different from the magnetic head according to the first embodiment in the following respects. In the magnetic head according to the present embodiment, the magnetic layer 43 does not have the first and second connecting surfaces. The top surface of the magnetic layer 43 extends to the medium facing surface 100 and is connected to the front end face of the magnetic layer 43. In the magnetic head according to the present embodiment, the magnetic layer 45 has an end face located in the medium facing surface 100.

The remainder of configuration, function and effects of the present embodiment are similar to those of the first embodiment.

Third Embodiment

Figure 8:
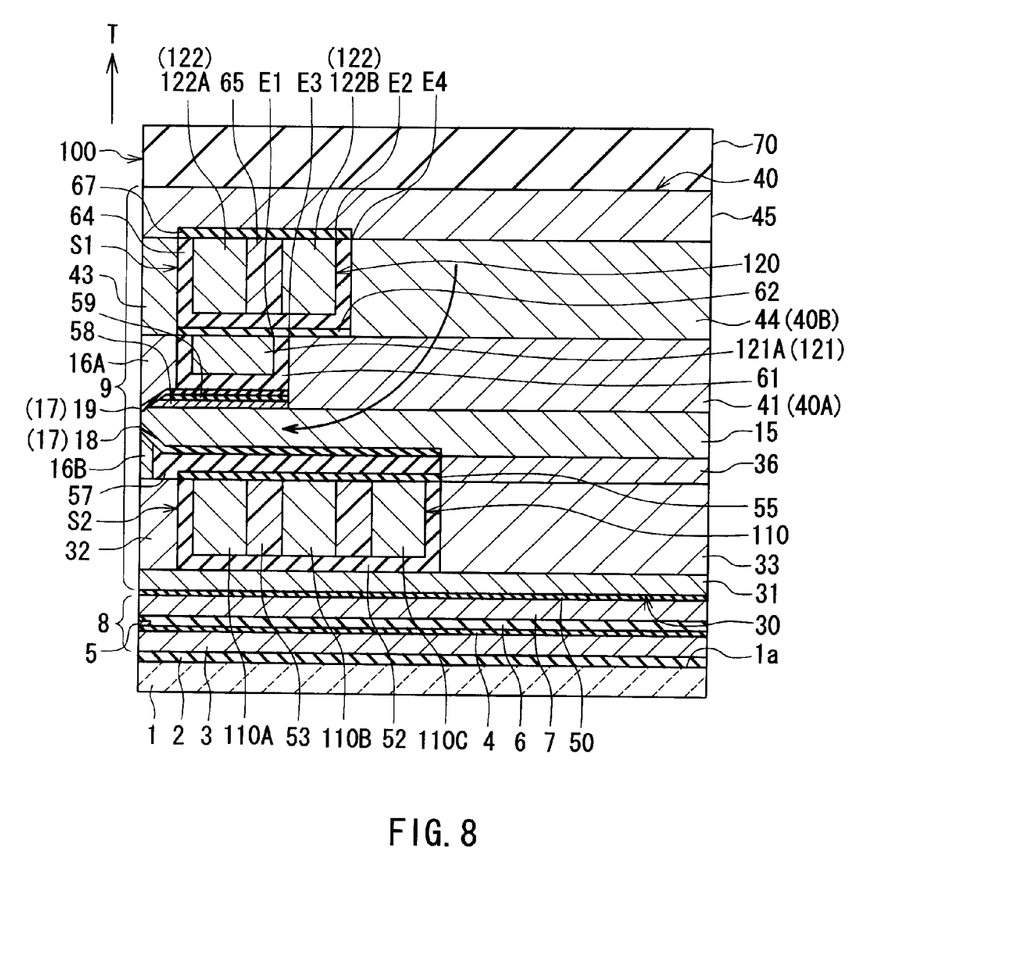
FIG. 8 is a cross-sectional view of a magnetic head according to a third embodiment of the invention.

A magnetic head according to a third embodiment of the invention will now be described with reference to FIG. 8. FIG. 8 is a cross-sectional view of the magnetic head according to the present embodiment. Note that FIG. 8 shows the main cross section. The arrow drawn within the magnetic head in FIG. 8 indicates the flow of magnetic flux.

The magnetic head according to the present embodiment is different from the magnetic head according to the second embodiment in the following respects. In the magnetic head according to the present embodiment, each of the magnetic layers 31 and 32 has an end face located in the medium facing surface 100. The magnetic head according to the present embodiment does not have the magnetic layers 34 and 35 and the insulating layer 56. The second shield 16B is disposed on the magnetic layer 32. The magnetic layer 36 is disposed on the magnetic layer 33. The nonmagnetic layer 57 is disposed on part of the top surface of the magnetic layer 34 and the top surface of the insulating layer 55, and surrounds the second shield 16B and the magnetic layer 36.

The remainder of configuration, function and effects of the present embodiment are similar to those of the second embodiment.

The present invention is not limited to the foregoing embodiments, and various modifications may be made thereto. For example, of the first return path section 40 and the second return path section 30, only the first return path section 40 may be provided in the magnetic head. Further, as far as the requirements of the appended claims are met, the numbers of the first to third coil elements may be arbitrarily chosen without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
a medium facing surface that faces a recording medium;
a coil that produces a magnetic field corresponding to data to be written on the recording medium;
a main pole that has an end face located in the medium facing surface, allows a magnetic flux corresponding to the magnetic field produced by the coil to pass, and produces a write magnetic field for writing the data on the recording medium by means of a perpendicular magnetic recording system;
a write shield that is made of a magnetic material and has an end face located in the medium facing surface;
a gap part that is made of a nonmagnetic material and interposed between the main pole and the write shield; and
a first return path section that is made of a magnetic material and located forward of the main pole in a direction of travel of the recording medium, wherein:
the end face of the write shield includes a first end face portion that is located forward of the end face of the main pole in the direction of travel of the recording medium;
the first return path section connects the write shield and part of the main pole away from the medium facing surface to each other so that a first space is defined by the main pole, the gap part, the write shield, and the first return path section;
the coil includes at least one first coil element and a plurality of second coil elements extending to pass through the first space;
the plurality of second coil elements are located forward of the at least one first coil element in the direction of travel of the recording medium;

the first return path section includes a first portion located such that the at least one first coil element is interposed between the first portion and the medium facing surface, and a second portion located such that the plurality of second coil elements are interposed between the second portion and the medium facing surface;

the second portion is located forward of the first portion in the direction of travel of the recording medium; and in a cross section that intersects the end face of the main pole located in the medium facing surface and that is parallel to the direction of travel of the recording medium and perpendicular to the medium facing surface, an end portion of the at least one first coil element that is located at a farthest position from the medium facing surface in the at least one first coil element is closer to the medium facing surface than is an end portion of the plurality of second coil elements that is located at a farthest position from the medium facing surface in the plurality of second coil elements, and an end portion of the first portion that is located at a closest position to the medium facing surface in the first portion is closer to the medium facing surface than is an end portion of the second portion that is located at a closest position to the medium facing surface in the second portion.

2. The magnetic head for perpendicular magnetic recording according to claim 1, wherein the at least one first coil element is smaller in number than the plurality of second coil elements.

3. The magnetic head for perpendicular magnetic recording according to claim 1, wherein:

the write shield includes a first shield, the first shield being located forward of the main pole in the direction of travel of the recording medium and including the first end face portion; and the at least one first coil element is interposed between the first shield and the first portion.

4. The magnetic head for perpendicular magnetic recording according to claim 1, wherein a minimum distance between the first portion and the medium facing surface falls within the range of 0.8 to 4.0 µm.

5. The magnetic head for perpendicular magnetic recording according to claim 1, further comprising a second return path section that is made of a magnetic material and located backward of the main pole in the direction of travel of the recording medium, the second return path section connecting the write shield and part of the main pole away from the medium facing surface to each other so that a second space is defined by the main pole, the gap part, the write shield, and the second return path section, wherein the coil further includes at least one third coil element extending to pass through the second space.

6. The magnetic head for perpendicular magnetic recording according to claim 1, wherein the end face of the write shield further includes a second, a third, and a fourth end face portion, the second end face portion being located backward of the end face of the main pole in the direction of travel of the recording medium, the third and fourth end face portions being located on opposite sides of the end face of the main pole in a track width direction.

* * * * *